United States Patent
Strohm et al.

(10) Patent No.: US 6,749,751 B1
(45) Date of Patent: Jun. 15, 2004

(54) FILTER MODULE COMPRISING TENSIONING ELEMENTS

(75) Inventors: Gerhard Strohm, Dexheim (DE); Georg Schnieder, Traisen (DE)

(73) Assignee: Seitzschenk Filtersystems GmbH, Bad Kreuznach (DE)

( * ) Notice: Subject to any disclaimer, the term of this patent is extended or adjusted under 35 U.S.C. 154(b) by 337 days.

(21) Appl. No.: 10/049,027

(22) PCT Filed: Aug. 25, 2000

(86) PCT No.: PCT/EP00/08305

§ 371 (c)(1), (2), (4) Date: Feb. 8, 2002

(87) PCT Pub. No.: WO01/17656

PCT Pub. Date: Mar. 15, 2001

(30) Foreign Application Priority Data

Sep. 8, 1999 (DE) .......................................... 299 15 781

(51) Int. Cl.⁷ .............................................. B01D 25/02
(52) U.S. Cl. .................... 210/232; 210/323.1; 210/346; 210/486
(58) Field of Search ............................. 210/232, 323.1, 210/346, 486, 488

(56) References Cited

U.S. PATENT DOCUMENTS 4,394,147 A * 7/1983 Caddy et al. ................. 55/357
5,055,192 A   10/1991 Artinyan et al.
5,482,624 A    1/1996 Swiatek et al.
5,607,584 A *  3/1997 Swiatek et al. ............. 210/238
6,180,002 B1 * 1/2001 Higgins ...................... 210/185
6,306,298 B1 * 10/2001 Diemer ....................... 210/232

FOREIGN PATENT DOCUMENTS

DE   37 41 552 A1   6/1989   .......... B01D/29/34
DE   40 26 934 A1   3/1992   .......... B01D/29/41
DE   197 44 574 A1  4/1999

* cited by examiner

Primary Examiner—Robert James Popovics
(74) Attorney, Agent, or Firm—Nixon & Vanderhye P.C.

(57) ABSTRACT

The invention relates to a filter module comprising a number A of circular filter cell (1), a number A–1 of spacer rings (3), and two end rings (4), whereby the filter cells (1) and the rings (3, 4) are combined to form a stack while forming a central continuous channel (2) using tension elements (5) which are interspaced in the circumferential direction of the channel wall and which, on the inner side, engage on the end rings (4) in order to transmit axial tension forces. According to the invention, tensioning elements comprised of strips (5) with hook-shaped ends (6, 13, 14) are provided for securely combining the filter cell that are arranged in a stack. Said hook-shaped ends can be fixed in the end rings by effecting an essentially radial hooking-in or engaging movement, In addition, means (10, 11) are provided which prevent an unintentional radial hook-removal or disengaging movement of the hook-shaped ends (6, 13, 14).

16 Claims, 4 Drawing Sheets

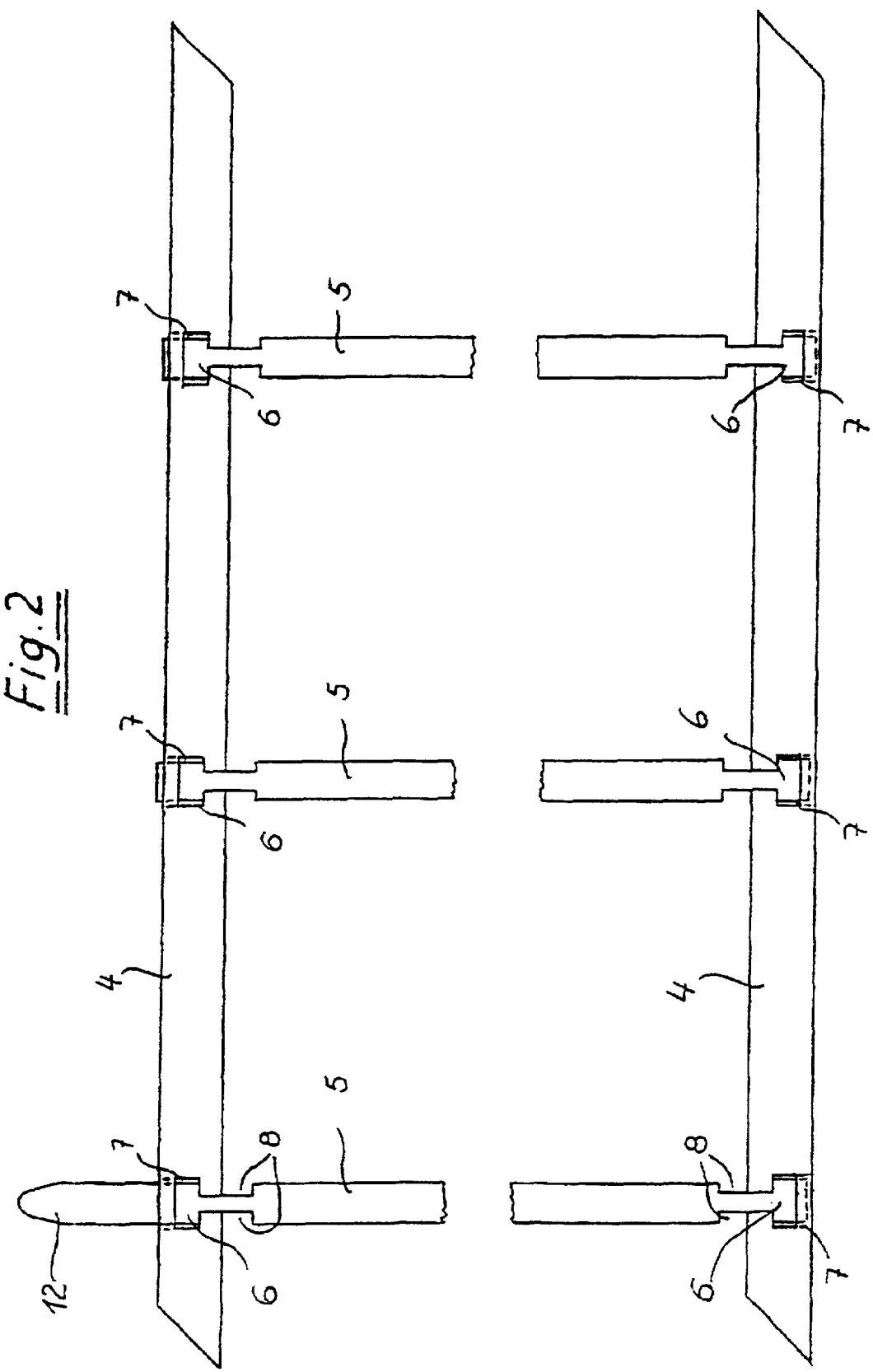

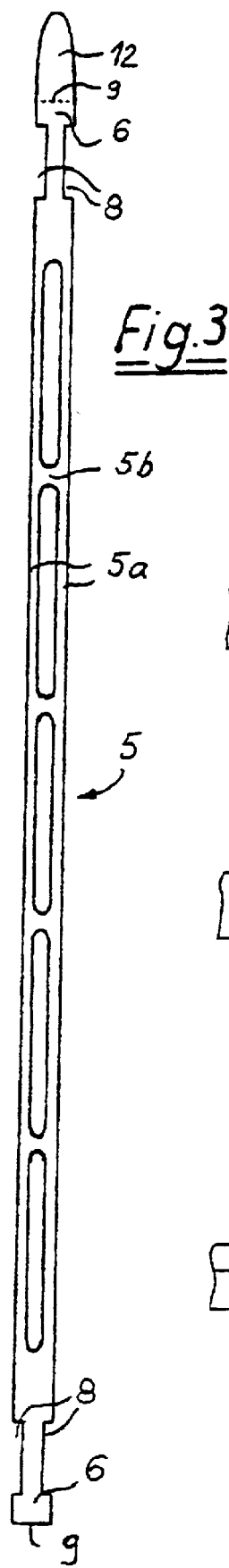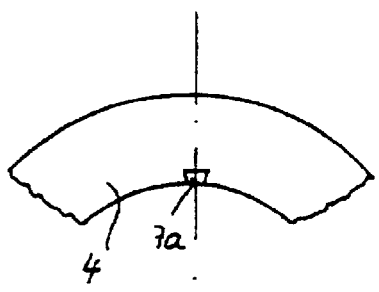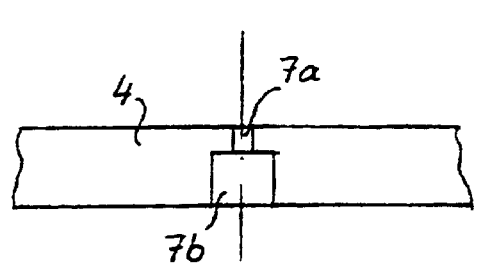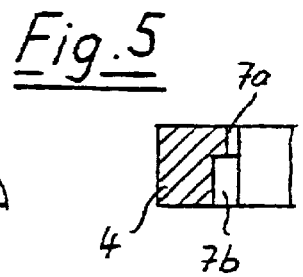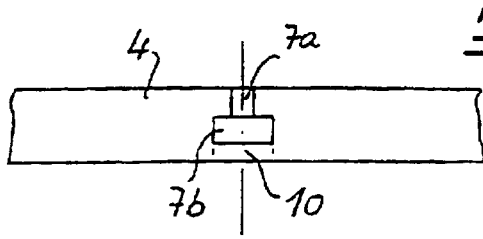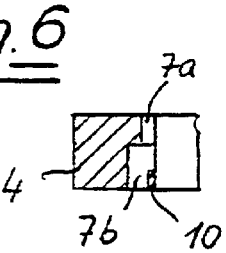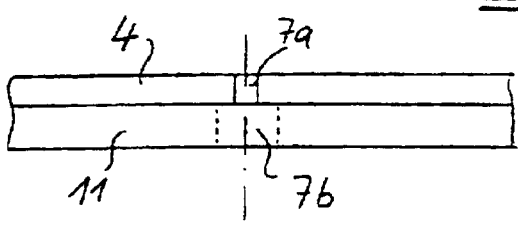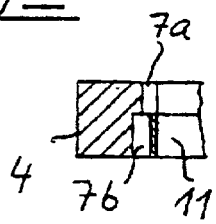

FILTER MODULE COMPRISING TENSIONING ELEMENTS

Figure 1:
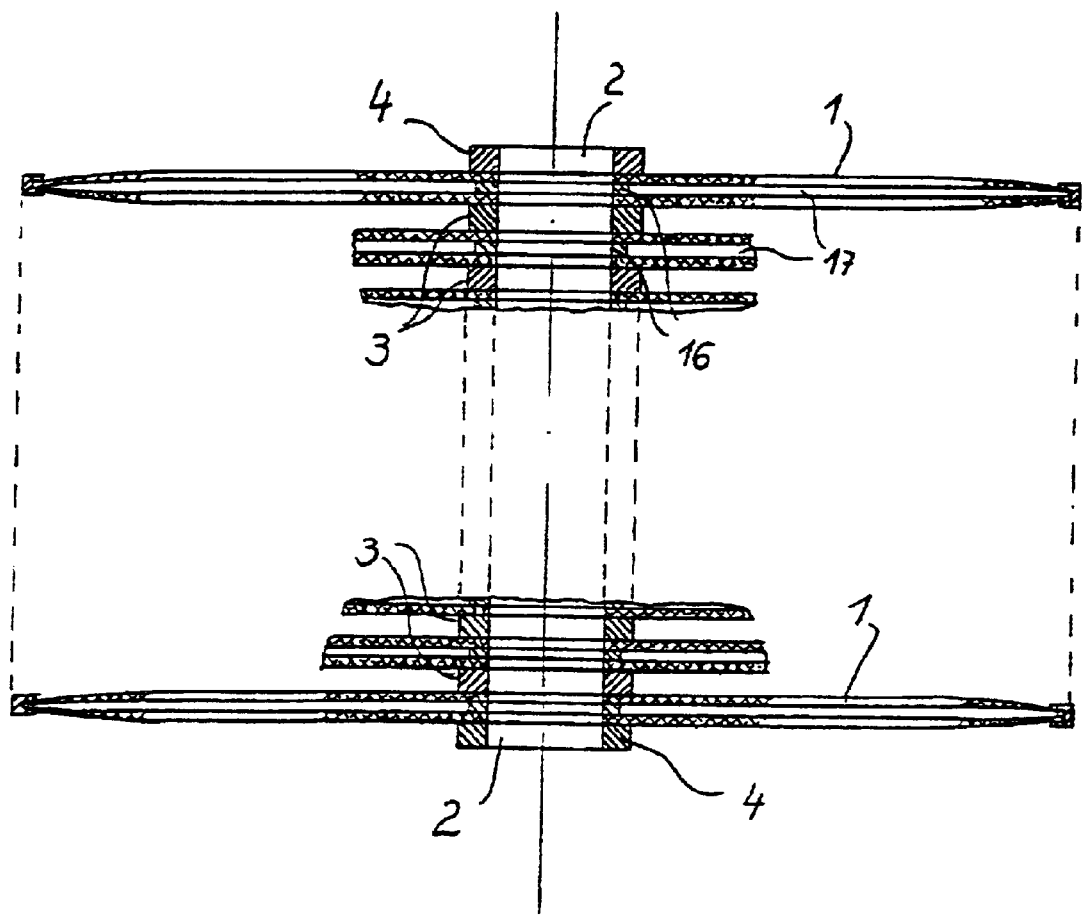

This application is the U.S. national phase of international application PCT/EP00/08305 filed Aug. 25, 2000 which designated the U.S.

The invention relates to a filter module with a number A of circular filter cells, a number A–1 of spacer rings and with two end rings, the filter cells and the rings being combined in a stack with the formation of a central through channel by means of clamping elements which are spaced apart in the peripheral direction of the channel wall and which engage the end rings on the inside to transfer axial clamping forces.

In these filter modules the filter cells ordinarily consist of two circular sections of a filter material which are held together on the outer periphery and between which otherwise discharge channels for the filtrate are formed by means of spacer elements.

In conventional filter modules a central support tube with radial passages is often used to be able to combine the filter cells into a stack (compare DE-OS 37 41 552 A1, DE-OS 40 26 934 A1). This construction is relatively complex and therefore has been replaced by a construction of the initially mentioned type in which the support tube can be abandoned.

In these filter modules the clamp elements consist of sheet metal bands which are angled on the end side and which in the peripheral direction are located spaced apart within the through channel and are supported with their ends angled to the outside on the end rings of the stack. The elastic restoration forces of the filter material provide for the clamp elements to be held under prestress and for their being unable to unintentionally move radially to the inside and therefore always remaining engaged with the end rings. When the filter module is installed in the filter housing, it is however compressed axially via suitable clamping means so far that the clamp elements are no longer under prestress and therefore can be easily released from their holding position. This results in that the filter module is no longer held together when it is replaced and falls apart into its individual parts. This is undesirable because dismantling becomes difficult and the disposal of used filter modules is time-consuming.

Another disadvantage of the known filter modules is that the clamp elements which consist of steel make it difficult to reprocess the other components of the filter module which are usually plastic. The clamp elements must be sorted out before the other material can be processed "sorted" and re-used.

Thus, in a filter module of the initially mentioned type in which a central support tube is no longer necessary, the object is to overcome the indicated disadvantages of the known clamp elements and to propose a filter module in which the clamp elements reliably hold the stack of filter cells together even after the external clamping forces have been relieved. Moreover, it should be possible to produce the clamp elements out of a material which together with the other parts of the filter module can be reused or disposed of as easily as possible.

To achieve this object it is proposed as claimed in the invention that the clamp elements consist of bands with ends which are made hook-shaped and which can be fixed on the end rings by means of an essentially radial hooking or locking motion and that there are means which prevent unintentional radial unhooking or unlocking motion of the hook-shaped ends.

In the production of the filter modules as claimed in the invention the clamp elements, like the known steel clamp elements, are spaced in the peripheral direction of the channel lip wall and are hooked or locked into the end rings. The elastic restoration forces of the filter material here also provide for the clamp elements to be under axial prestress for installation of the filter module in the filter housing. In the illustrated cancellation of this prestress by external clamping forces when the filter module is installed in the filter housing the bands as claimed in the invention are likewise relieved, but due to the provided retaining means cannot radially unhook or unlock, so that the stack of filter cells is held together by the clamp elements consisting of the bands even when it has been removed from the filter housing. The filter module can therefore not fall apart into its individual parts and is much easier to handle in disposal and reprocessing than the host of its individual parts.

Advantageous embodiments of the inventive idea are described in dependent claims 2 to 16. Other details are explained using the embodiments shown in FIGS. 1 to 9.

Figure 8:
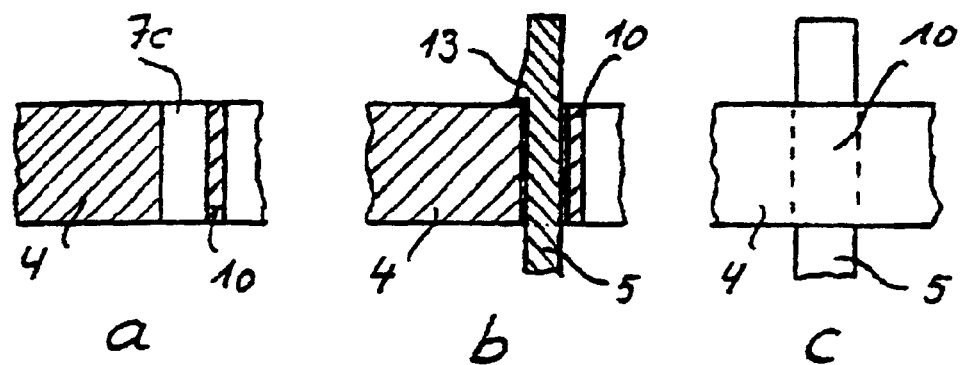
Figure 9:
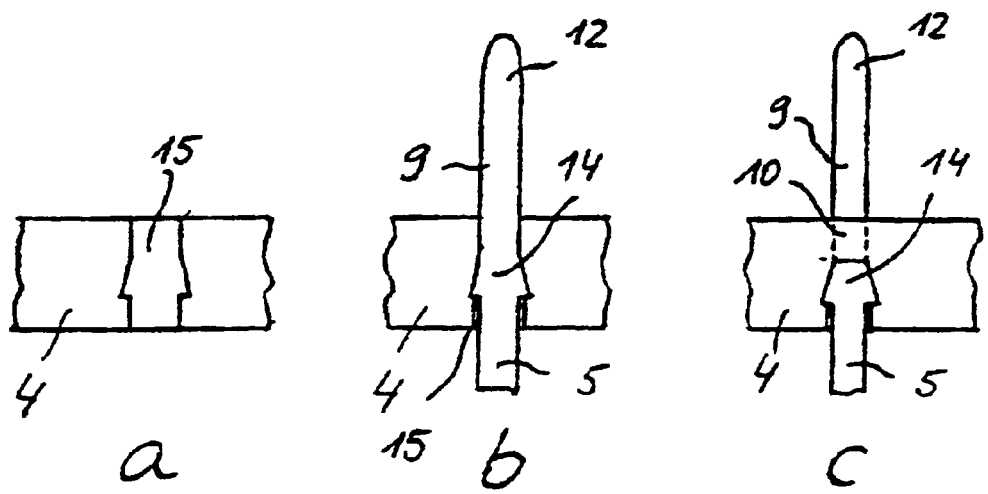

FIG. 1 shows a section through a filter module as claimed in the invention in a simplified representation, FIG. 2 shows one developed view of the end rings with a first embodiment of the clamp elements, FIG. 3 shows one embodiment of the clamp element, FIG. 4 shows one embodiment of the locking cross section in the end ring, FIG. 5 shows another shape of the locking cross section in the end ring, FIG. 6 shows another shape of the locking cross section in the end ring, FIG. 7 shows still another embodiment of the locking cross section in the end ring, FIG. 8 *a–c* shows an embodiment for a hooking version, FIG. 9 *a–c* shows a second embodiment for a hooking version.

In the filter module as shown in FIG. 1, a number of circular filter cells 1 is combined into a stack between the end rings 4 and the stack is held together by means of clamp elements which are not shown. The filter cells consist conventionally of two layers of filter material which are held together on the edge side and between which spacer elements 16 form discharge channels 17 for the filtrate. Between the filter cells 1 there are spacer rings 3 which together with the end rings 4 and the filter cells 1 form a central through channel 2 via which the filtrate can be drained. The spacer rings 3 are used conventionally at the same time for sealing of the feed spaces between the individual filter cells 1 against the through channel 2.

In FIG. 2 the end rings 4 are shown as a developed view in the plane of the drawing in order to better explain the interaction with the clamp elements which consist of bands 5. The bands 5 have hook sections 6 which are hammerhead-like on the end side and with which they can fit into the correspondingly shaped recesses 7 in the inside wall of the end rings 4. The bands 5 have a rectangular cross section which is diminished in steps by edge-side recesses 8 to form hammerhead-like hook sections 6 located on the end side. On the end of the left band 5 a separable hand-operated clip 12 is shown; it is molded onto the hook section in one piece as an extension. It is used to facilitate dismounting of the bands 5. The bands 5 are secured. against radially unhooking from the end rings 4, as is detailed using FIGS. 4 to 9.

FIG. 3 shows a band 5 isolated. It has an essentially rectangular cross section which is diminished in steps by edge-side recesses 8 to form the hammerhead-like hook sections 6 which are located on the end side. On one of the ends 9 a separable hand-operated clip 12 is molded in one piece. Between the hook sections 6 which are located on the end side the band is made ladder-shaped with two crosspieces 5a which are continuous on the edge side and several transverse crosspieces 5b which are spaced relative to one another.

In the embodiment of the recess 7a, in the end ring 4, the band 5 is prevented from disengaging from the engagement position by the recess 7a being made trapezoidal in cross section and by the interacting cross sections of the band 5 and the recess 7a being matched to one another such that they can engage one another only with elastic deformation which is enough to prevent unintended radial disengagement.

As FIG. 5 shows, the recess 7a which is trapezoidal in cross section can be combined with a recess 7b of greater depth which is widened in steps and which is matched to the hammerhead-like hook section 6 of the bands and in the axial direction of the bands 5 enables a form-fitted connection.

In the embodiment shown in FIGS. 6 and 7, the recess sections 7a are not made trapezoidal in cross section. In these cases the protection against unintentional radial disengagement consists in that on the end ring 4 there is a material bridge 10 which partially overlaps the recess section 7b and which is made in one piece with the end ring 4. In the embodiment as shown in FIG. 7 there is a separate retaining ring 11 which covers the recess area 7b and is held by force-fit in the end ring 4.

In the embodiment shown in FIG. 8, the bands 5 are equipped with a barbed projection 13 which fits over the end ring 4 on the outside, while unintentional radial disengagement motion is prevented by a material bridge 10 which is molded on in one piece. In this case the end rings 4 in cross section have uniform, through slots 7c for inserting the band 5. The material bridges 10 which are molded on in one piece can of course be replaced by separately produced retaining rings 11 as shown in FIG. 7, in this case the end ring 4 having grooves open to the inside.

In the embodiment as shown in FIG. 9, the bands have projections 14 which extend in the peripheral direction of the end rings, while in the inside wall of the end rings there are recesses 15 of the corresponding shape. Here the projections 14 and the recesses 15 are matched to one another such that engagement is possible only after slight elastic deformation. In this way a connection which works by form-fit in the axial direction of the filter module is produced. As a result of elastic deformation this connection is already protected against unintentional radial disengagement. In addition, as shown in FIG. 9c, there can be a material bridge 10 which partially overlaps the recess 15 and which is made in one piece with the end ring. Alternatively, of course a separate retaining ring 11 as shown in FIG. 7 can also be used here.

Thus a filter module is made available which overcomes the defects which have been established in the prior art and meets all the initially set conditions. Connecting means which work by force-fit, form-fit or combined can be used to transfer the axial clamping forces and also to protect against unintentional radial unhooking or unlocking motion.

What is claimed is:

1. Filter module with a number A of circular filter cells cells (1), a number A–1 of spacer rings (3) and with two end rings (4), the filter cells (1) and the rings (3, 4) being combined in a stack with the formation of a central through channel (2) by means of clamp elements (5) which are spaced apart in the peripheral direction of the channel wall and which engage the end rings (4) on the inside to transfer axial clamp forces, charcterized in that the clamp elements consist of bands (5) with ends (6, 13, 14) which are made hook-shaped and which can be fixed on the end rings (4) by means of an essentially radial hooking or catching motion and that there are means (10, 11) which prevent unintentional radial unhooking or unlocking motion of the hook-shaped ends (6, 13, 14).

2. Filter module as claimed in claim 1, wherein the bands (5) are connected by form-fit to the end rings (4) to transfer the axial clamping forces.

3. Filter module as claimed in claim 2 wherein the bands (5) on the end side each have a hook-shaped projection (13) which is pointed radially to the outside and by which they are surpported in the installed state on the outside of the end rings (4).

4. Filter module as claimed in claim 3, wherein the end rings (4) have axially extending recesses (16) which are traversed on the inside over part of their axial extension by a material bridge which is molded on in one piece, the cross section of the recesses (16) which is closed in this way is dimensioned such that the bands (15) can be routed through with projection (13) which are radially pointed to the outside only as the elastic restoration force is overcome.

5. Filter module as claimed in claim 3, wherein the bands (5) on the end side have projections (14) which extend in the peripheral direction of the end rings (4) and that in the inside wall of the end rings (4) there are recesses (15) of the corresponding shape.

6. Filter module as claimed in claim 5, wherein the recesses (7, 15) in the inside wall of the end rings (4) have a cross section which is uniform in the axial direction, which widens trapezoidally to the outside and which on the inside at least in areas has a somewhat smaller width than the corresponding part of the bands (5) so that the ends of the bands (5) can be pressed into the recesses (7, 15) only as the elastic recovery force is overcome and the elastic recovery force can be used as protection against unintentional disengagement.

7. Filter module as claimed in claim 5, wherein the recesses (7, 15) in the inside wall are traversed over part of their axial extension by a material bridge (10) which is molded on in one piece and which prevents unwanted radial unhooking of unlocking motion of the hook shaped ends (6, 14) of the bands (5).

8. Filter module as claimed in claim 7, wherein the recesses (7, 15) which are traversed by the material bridge (10) in the inside wall of the end rings (4) and the hook-shaped ends (6, 14 ) of the bands (5) are matched to one another in terms of dimensions such that the bands (5) can be axially inserted into the recesses (7, 15) only as elastic recovery forces are overcome and wherein the form-fitted hooking occurs to transmit axial clamping forces by elastic re-deformation of the material areas involved.

9. Filter module as claimed in claim 2, wherein the bands (5) have a rectangular cross section which is diminished in steps by edge-side recesses (8) to form hammerhead-like hook sections (6) located on the end side, and wherein in the inside wall of the end ring (4) there are recesses (7) of the corresponding shape.

10. Filter module as claimed in claim 1, wherein there are separately produced retaining rings (11) which prevent unhooking or unlocking motion of the hook-shaped ends (6, 14) of the bands (5), which motion is pointed radially to tho inside.

11. Filter module as claimed in claim 10, wherein the retaining rings (11) are held by force-fit in the end rings (4).

12. Filter module as claimed in claim 1, wherein the bands (5) consist of plastic and are shaped essentially like known cable joiners.

13. Filter module as claimed in claim 12, wherein between the hook or lock sections (6, 13, 14) which are located on the end sale the bands (5) are made ladder-like with two crosspieces (5a) which are continuous on the edge side and several transverse crosspieces (5b) which are spaced relative to one another.

14. Filter module as claimed in claim 12, wherein the on one end (9) the bands (5) have a separable hand-operated clip (12) which is molded in one piece as an extension onto the hook or lock sections (6, 13, 14).

15. Filter module as claimed in claim 1, wherein the bands (5) consist of the same material as the spacer rings and end rings (3, 4).

16. Filter module as claimed in claim 1, wherein the sealing rings (3) on their inside wall have axially continuous recesses which are matched to the cross section of the bands (5).

* * * * *